US012001760B2

(12) United States Patent
Wu et al.

(10) Patent No.: US 12,001,760 B2
(45) Date of Patent: Jun. 4, 2024

(54) BOUNDARY-FREE PERIODIC MESHING METHOD

(71) Applicant: ANSYS, INC., Canonsburg, PA (US)

(72) Inventors: Yunjun Wu, Pittsburgh, PA (US); Wei Yuan, Sewickley, PA (US)

(73) Assignee: ANSYS, INC., Canonsburg, PA (US)

( * ) Notice: Subject to any disclaimer, the term of this patent is extended or adjusted under 35 U.S.C. 154(b) by 290 days.

(21) Appl. No.: 16/730,568

(22) Filed: Dec. 30, 2019

(65) Prior Publication Data

US 2021/0064791 A1 Mar. 4, 2021

Related U.S. Application Data

(60) Provisional application No. 62/894,312, filed on Aug. 30, 2019.

(51) Int. Cl.
*G06F 30/10* (2020.01)
*G06F 30/20* (2020.01)
*G06T 7/11* (2017.01)
*G06T 7/12* (2017.01)
*G06T 7/149* (2017.01)
*G06T 7/246* (2017.01)
*G06T 17/20* (2006.01)

(52) U.S. Cl.
CPC .............. *G06F 30/10* (2020.01); *G06F 30/20* (2020.01); *G06T 7/11* (2017.01); *G06T 7/12* (2017.01); *G06T 7/149* (2017.01); *G06T 7/251* (2017.01); *G06T 17/20* (2013.01); *G06T 17/205* (2013.01)

(58) Field of Classification Search
CPC ...... G06F 30/10; G06F 30/20; G06F 2111/10; G06F 30/23; G06F 30/25; G06T 17/20; G06T 17/205; G06T 7/149; G06T 7/12; G06T 7/11; G06T 7/251
See application file for complete search history.

(56) References Cited

U.S. PATENT DOCUMENTS

2008/0005711 A1* 1/2008 Scheffer ............... G06F 30/392
716/135
2014/0184599 A1* 7/2014 Quilot .................... G06T 17/10
345/423

FOREIGN PATENT DOCUMENTS

JP 2011191896 A * 9/2011
JP 2019049792 A * 3/2019

OTHER PUBLICATIONS

Lo SH (2002) Finite element mesh generation and adaptive meshing. Prog Struct Eng Mater 4(4):381-399. https://doi.org/10.1002/pse.135 (Year: 2002).*

(Continued)

*Primary Examiner* — Boris Gorney
*Assistant Examiner* — Pursottam Giri
(74) *Attorney, Agent, or Firm* — Womble Bond Dickinson (US) LLP

(57) ABSTRACT

Machine assisted systems and methods for use in meshing a periodic pattern of a geometry that represents a physical structure in a simulation of the physical structure are described. The method can include operations: identifying a master region in a periodic pattern of a geometry that represents a physical structure in a simulation of the physical structure that has the periodic pattern; and generating a mesh based on the identified master region, the mesh including a non-planar boundary at a boundary between patterns in the periodic pattern, wherein the master region is only a portion of the representation of the physical structure.

22 Claims, 18 Drawing Sheets

(56) References Cited

OTHER PUBLICATIONS

T. Mizoguchi, S. Kanai "Decomposing scanned assembly meshes based on periodicity recognition and its application to kinematic simulation modeling" Journal of Computer-Aided Design, 45 (4) (2013), pp. 829-842 (Year: 2013).*
Liang, X., & Zhang, Y.J. (2013). An octree-based dual contouring method for triangular and tetrahedral mesh generation with guaranteed angle range. Engineering with Computers, 30, 211-222. (Year: 2013).*
White, D.R., & Saigal, S. (2002). Improved Imprint and Merge for Conformal Meshing. IMR. (Year: 2002).*
Philippe P. Prebay "Proceedings of the 15th International Meshing Roundtable", 2006 Springer, Berlin, Heidelberg https://doi.org/10.1007/978-3-540-34958-7 (Year: 2006).*
Schneider, K., Klusemann, B., & Bargmann, S. (2016). Automatic three-dimensional geometry and mesh generation of periodic representative vol. elements for matrix-inclusion composites. Adv. Eng. Softw., 99, 177-188. (Year: 2016).*
Nowottny, D. (Oct. 1997). Quadrilateral mesh generation via geometrically optimized domain decomposition. In Proceedings, 6th International Meshing Roundtable (pp. 309-320). (Year: 1997).*
Shepherd, Jason F. Topologic and geometric constraint-based hexahedral mesh generation. vol. 68. No. 03. 2007. (Year: 2007).*

\* cited by examiner

Default Master Region　　Sweep Angle Detection　　Defined Master Region

Final Mesh:
- Master boundary: 68
- Slave boundary: 68

Final Mesh:
- Master boundary: 17
- Slave boundary: 17

BOUNDARY-FREE PERIODIC MESHING METHOD

This application claims the benefit of U.S. Provisional Patent Application No. 62/894,312, filed on Aug. 30, 2019, which application is incorporated herein by reference.

BACKGROUND

In a simulation of a rotational motor design, a full motor model normally has repeating patterns in a physical geometry which is rotationally periodic. If both the physical geometry and the expected simulation result are rotationally periodic, the computation can be performed over just one repeating pattern with a rotational periodic boundary condition. The benefit of doing this is reducing the simulation time and the memory cost of the computation. It is usually required that the meshes match exactly at the periodic boundaries, such that the mesh covering the full model is conformal when assembling the copies of one region mesh. The conventional method of creating periodic boundary condition, is to perform a geometric cut on the model with planar surfaces and applying a periodic boundary condition on the planes prior to meshing. Inevitably, the geometric planar cut could create bad geometries, such as mismatches, tiny pieces, and small gaps near the boundaries, which increase the difficulties in the mesh and reduce the mesh quality and the simulation accuracy. For a skewed motor design, the clone mesh cannot maintain their periodic identity at the planar matching boundary, which will introduce simulation errors.

Traditional method for simulation of periodic model can be achieved by a full model simulation or a partial model simulation. The full model simulation often yields large mesh size, much longer simulation time, and an unrepeatable solution in periodic regions. Whereas, the partial model simulation is often attributed to an inevitable model cut, bad quality mesh at cutting boundaries, and an increased solution error due to bad quality mesh at cutting regions.

Traditional method has limitations. The traditional partial model planar matching boundary mesh is often associated with inevitable model cut, force matching boundary mesh at cutting narrow gap, bad quality mesh at critical boundaries, increased solution error, and cannot achieve 100% of repeatable mesh in 3D skewed clone regions. In a 3D skewed motor simulation model, the associated common problems include: (1) "Dirty" Model in which there will be leftover tiny pieces, small gaps at important master and slave boundaries; (2) Geometry mismatch between master and slave boundary that gives low reliable matching boundary mesh; and (3) Bad quality matching boundary mesh that gives low mesh quality mesh at critical boundaries.

Thus, Applicants have recognized that there is a need for a system and related methods with boundary-free periodic partial mesh for full model.

SUMMARY

The present disclosure describes herein a mesh generation method with arbitrary non-planar matching boundaries. Instead of cutting out a partial model in one periodic region from the full model, the mesh generation method can directly work on the full model but generating a partial mesh in one of the periodic regions with the arbitrary non-planar matching boundary mesh. This mesh generation method may not only simplify the simulation process by avoiding bad geometry cuts, but can also ensure a high quality matching boundary mesh and a hundred percent of repeatable identical mesh in skewed clone regions.

A method according to one embodiment described herein can include the following operations: identifying master region, base mesh builder, interior region mesh (stage 1), mesh split, assembling mesh migration, and interior region mesh (stage 2).

The procedures of creating this boundary-free periodic mesh can include:

(1) Automatically identify a master periodic meshing region by targeting minimum geometry cuts at a central plane.

(2) Build the multi-regions of an adaptive base mesh, and ensure matched master and slave mesh.

(3) Interior region only meshing method (stage 1), by freezing the fringe mesh near the matching boundaries.

(4) Split the mesh by the central plane into static and floating mesh regions.

(5) Migrate the floating region mesh by the periodic sweeping angle and assemble the mesh. Arbitrary matching boundary mesh is automatically generated.

(6) Interior region only meshing method again (stage 2) by repeating step (3) to complete the meshing processes.

According to one embodiment described herein, a non-transitory machine readable medium storing executable program instructions which when executed by a data processing system causes the data processing system to perform a method. The method can include the following operations: identifying a master region in a geometry with a periodic pattern, the geometry representing a physical structure in a simulation of the physical structure that has a periodic pattern; generating an adaptive base mesh of the identified master region; dividing the generated adaptive base mesh of the master region into a first interior region and a first fringe region; generating a first mesh to the first interior region of the master region; partitioning the generated first mesh of the first interior region of the master region into a static portion and a floating portion; rotating the floating portion by a periodic region angle; and assembling the static portion and the migrated rotated floating portion to generate an arbitrary matching boundary mesh of the geometry with the periodic pattern.

In one embodiment, the method can further include the following operations: dividing the generated assembled arbitrary matching boundary mesh into a second interior region and a second fringe region; and generating a second mesh to the second interior region of the generated assembled arbitrary matching boundary mesh.

In one embodiment, the identifying of the master region can include identifying a default master region; detecting a sweep angle; and identifying the master region.

In one embodiment, the detecting of the sweep angle can include checking a geometry intersection on each cut through the master region and determining the minimum geometry intersection.

In one embodiment, the generating of the adaptive base mesh can include generating a coarse mesh of a first portion of the master region; generating a mirror mesh of a second portion of the master region by mirroring the generated coarse mesh to cover the second portion of the master region; assembling the generated coarse mesh of the first portion of the mater region and the generated mirror mesh of the second portion of the master region; and adaptively refining the generated coarse mesh while maintaining a valid matching boundary.

In one embodiment, the first fringe region can include a plurality of mesh elements connected to the matching boundary mesh.

In one embodiment, the generating of the first mesh to the first interior region of the master region can include freezing the first fringe region; meshing the geometry features in first interior region; and assembling the generated first mesh of the first interior region of the master region and the frozen first fringe region.

In one embodiment, the static segment can include a plurality of elements in the generated first mesh of the first interior region of the master region having a central point location angle larger than the central plane angle.

In one embodiment, the floating segment can include a plurality of elements in the generated first mesh of the first interior region of the master region having a central point location angle equal to or smaller than the central plane angle.

In one embodiment, the method can further include operations creating a new arbitrary boundary at an interface of the static segment and the floating segment.

The present disclosure is also directed to a non-transitory machine readable medium storing executable program instructions which when executed by a data processing system causes the data processing system to perform a method. The method can include operations: identifying a master region in a periodic pattern of a geometry that represents a physical structure in a simulation of the physical structure that has the periodic pattern; and generating a mesh based on the identified master region, the mesh including a non-planar boundary at a boundary between patterns in the periodic pattern, wherein the master region is only a portion of the representation of the physical structure.

In one embodiment, the identifying can include detecting an optimized cut through the master region based on a minimal intersection of geometries representing objects in the physical structure.

In one embodiment, the generating can include generating a plurality of mesh regions within the identified master region.

In one embodiment, a result from the simulation can be used to design the physical structure or is used to modify the design of the physical structure or is used to configure a fabrication or manufacturing process for the physical structure.

In one embodiment, the non-planar boundary can be constructed based on the detected optimized cut through the master region.

In one embodiment, the generated mesh based on the identified master region can be duplicated to generate a conformal mesh for the geometry that represents a physical structure in the simulation.

In one embodiment, the generated plurality of mesh regions can maintain a matching boundary condition at the boundary between patterns in the periodic pattern of the geometry that represents a physical structure in a simulation of the physical structure that has the periodic pattern.

In one embodiment, the generating can include detecting a plurality of regions at the boundary between patterns, the plurality of regions being excluded from being meshed.

In one embodiment, the generated mesh can be partitioned into a plurality of regions based on the detected optimized cut through the master region.

In one embodiment, the generated plurality of mesh regions within the identified master region can include a base mesh and a duplicate mesh. A boundary region of the duplicate mesh can share an identical characteristic as a region in the base mesh at the boundary between patterns in the periodic pattern.

The present disclosure is also directed to a non-transitory machine readable medium storing executable program instructions which when executed by a data processing system cause the data processing system to perform a method. The method can include identifying a master region in a geometry representing a physical structure, wherein the geometry corresponds to repetitions of the master region.

In one embodiment, the method can also include generating an adaptive base mesh of the identified master region, the adaptive base mesh including matching boundaries, each matching boundary next to a respective neighboring repetition of the master region in the geometry.

In one embodiment, the method can further include generating a first mesh for features of the geometry in a portion of the master region bounded by boundary meshes of the matching boundaries in the adaptive base mesh, wherein the first mesh can be generated with the boundary meshes frozen.

In one embodiment, the method can further include partitioning the generated first mesh into a first portion and a second portion along a mesh boundary, wherein the first portion can be connected to a first one of the boundary meshes via a first one of the matching boundaries, and wherein the second portion can be connected to a second one of the boundary meshes via a second one of the matching boundaries.

In one embodiment, the method can further include generating an arbitrary matching boundary mesh representing a separate region of the geometry, wherein the geometry can correspond to repetitions of the separate region, wherein the arbitrary matching boundary mesh can correspond to an assembly of the first portion connected to the first one boundary mesh and the second portion connected to the second one boundary mesh, and wherein the arbitrary matching boundary mesh can include matching boundaries, each matching boundary of the arbitrary matching boundary mesh can correspond to the mesh boundary for the partition of the first portion and the second portion, and each matching boundary of the arbitrary matching boundary mesh can be next to a respective neighboring repetition of the separate region in the geometry.

In one embodiment, the method can further include generating a second mesh for features of the geometry in the portion of the master region bounded by boundary meshes of the matching boundaries in the adaptive base mesh, wherein the second mesh can be generated with the boundary meshes frozen.

In one embodiment, the second portion can be rotated by a periodic region angle.

The aspects and embodiments described herein can include non-transitory machine readable media that store executable computer program instructions that when executed can cause one or more data processing systems to perform the methods described herein when the computer program instructions are executed by the one or more data processing systems. The instructions can be stored in non-volatile memory such as flash memory or dynamic random access memory which is volatile, or other forms of memory.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
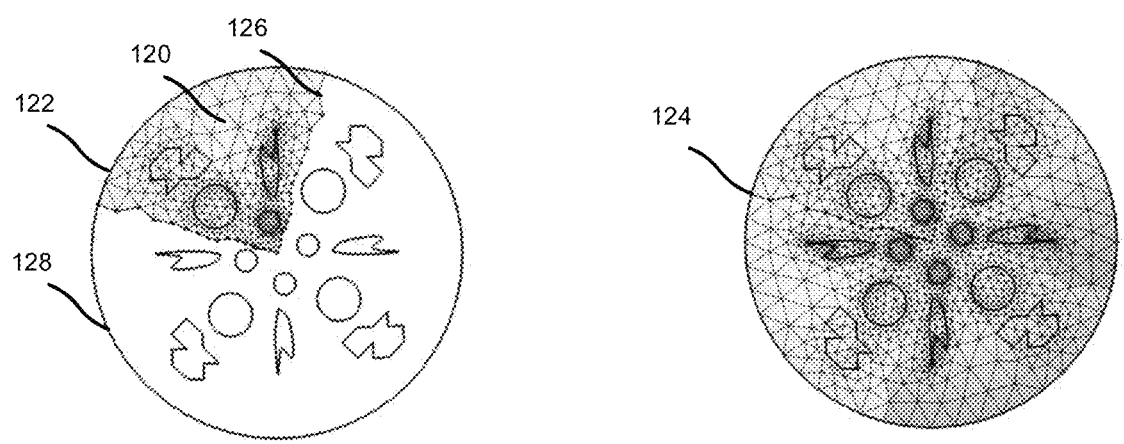
FIG. 1 shows an example diagram illustrating partial mesh with full model according to one embodiment of the disclosure.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

The embodiments of the boundary-free periodic partial mesh for full model method can work with the full model such that a geometry preparation can be skipped. Therefore, in this manner, a simplified simulation process can be achieved. By working with the full model, bad cuts can be avoided and therefore a higher mesh successful rate can be achieved. Further, by working with the full model, a clean model can be achieved such that no tiny pieces or narrow gaps result. Because there are no tiny pieces or narrow gaps created by geometry preparation, a higher mesh quality can be achieved.

The method disclosed herein can provide benefits such as a non-planar matching boundary mesh for a full model, a multi-region base mesh builder, an interior region only meshing method, a mesh split and migration method for an arbitrary matching boundary mesh, and an optimized master region detection method. The matching boundary mesh for periodic regions of a geometry can include meshes that can be exactly match for each pair (edge for 2D, triangle for 3D) of meshes at a boundary.

The embodiments of a method described herein can allow a mesh generation method with arbitrary matching boundaries to work directly on a full model while generating a partial mesh in one of the periodic regions with the arbitrary non-planar matching boundary mesh. Hence, this approach may not only simplify the simulation process by avoiding bad geometry cuts, but can also ensure a high quality matching boundary mesh and a one hundred percent of repeatable identical mesh in skewed clone regions. Further, the embodiments of a method can avoid model cut, simplify simulation process, provide flexible master region choice (mesh choice), provide high quality and uniform mesh everywhere, reduce simulation error, and achieve one hundred percent of repeatable mesh in 3D skewed clone regions.

The embodiments of the boundary-free periodic partial mesh for full model method can work with full model such that a geometry preparation can be skipped; therefore, a simplified simulation process. By working with full model, bad cuts can be avoided and therefore a higher mesh successful rate can be achieved. Through working with full model, clean model can be achieved such that there are no tiny pieces or narrow gaps. Because there are no tiny pieces or narrow gaps, a higher mesh quality can be achieved.

In one embodiment, the boundary-free periodic partial mesh for full model method can also provide flexible master region mesh. This method can be more reliable and efficient. The method can also satisfy solver-demand boundary mesh. Easier clone region mesh can be obtained.

Further, the boundary-free periodic partial mesh for full model method can allow non-planar matching boundary mesh. As a result, one hundred percent of identical matching boundary mesh can be achieved. High quality mesh at matching boundary can also be achieved. Uniform mesh is everywhere. Hundred percent of repeatable mesh in skewed clone regions can be obtained.

FIG. 1 illustrates an example diagram illustrating a partial mesh with a full model according to one embodiment of the disclosure. The partial mesh generated based on the method described herein can be duplicated to generate a conformal mesh for the full model. The two conditions for a conformal mesh can include: (1) the intersection between any two elements is a sub-element of both: a face, an edge, a node or nothing (the void set); and (2) the maximal dimensional shared element must be only one and complete.

Figure 11:
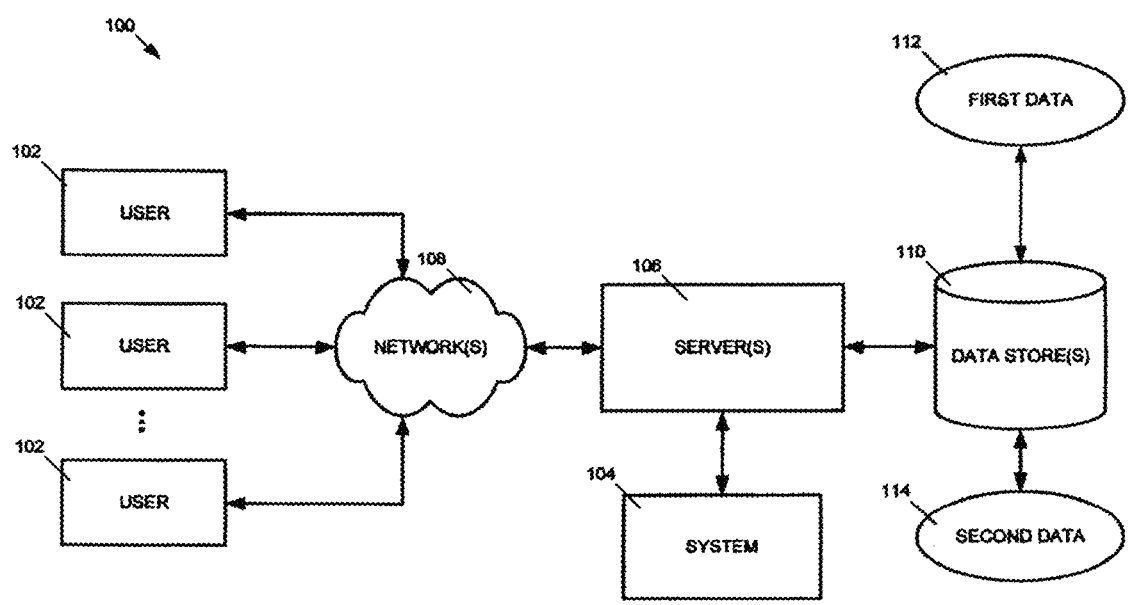
FIGS. 11, 12A-12C depict example systems which may be used in conjunction with the embodiments described herein.

In some embodiments, a system such as the system 104 illustrated in FIG. 11 can be configured to generate a mesh for a geometry 128 representing a physical structure of various dimensions, including, for example, a two-dimensional (2D) geometry and a three-dimensional (3D) geometry. As further illustrated in FIG. 11, the system 104 can assist one or more users 102 operating the one or more computing devices to retrieve the engineering model having the geometry 128.

In one embodiment, the generated mesh 120 based on partial region 122 can be duplicated to generate a conformal mesh 124 for the geometry 128 that represents a physical structure in a simulation as shown in FIG. 1.

In one embodiment, the generated plurality of mesh regions can maintain a matching boundary condition at the boundary 126 between patterns in the periodic pattern of the geometry 128 that represents a physical structure in a simulation of the physical structure that has the periodic pattern.

Figure 2A:
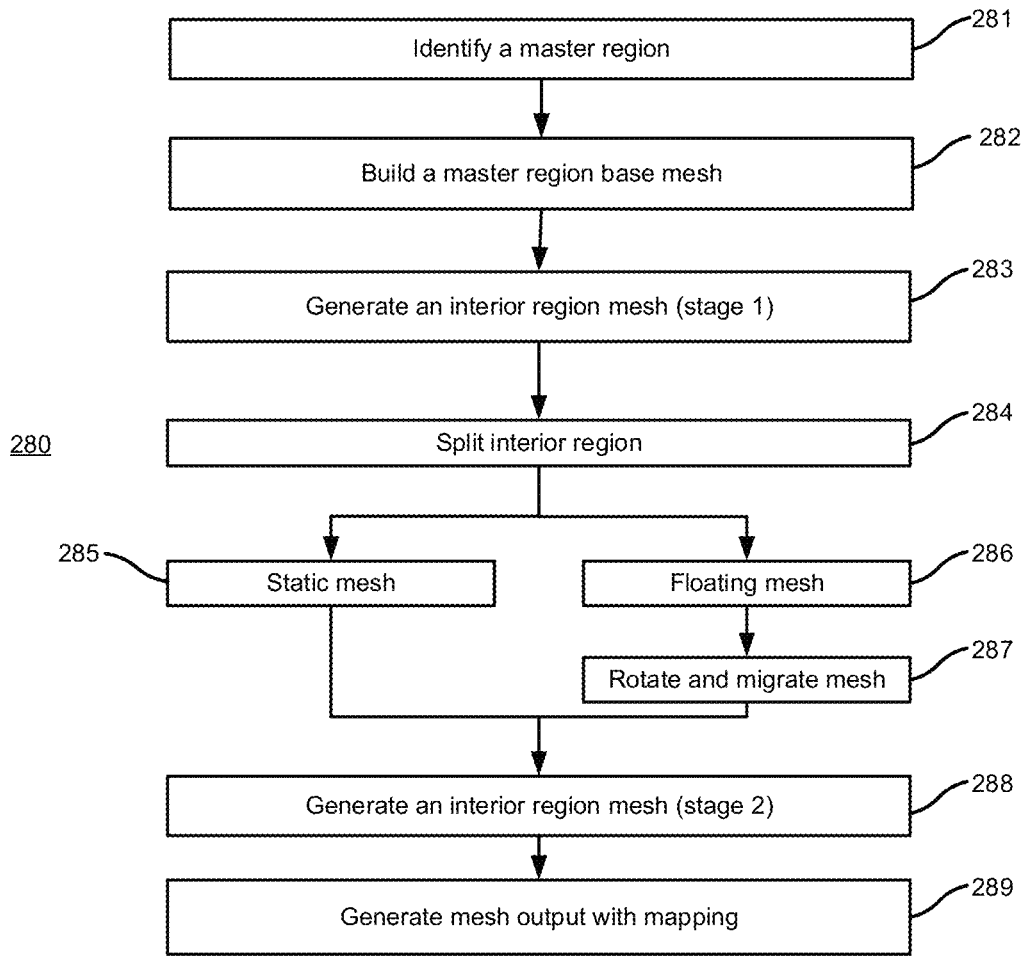
FIG. 2A shows a flow diagram illustrating one embodiment of boundary-free periodic partial mesh for full model method according to one embodiment of the disclosure.

FIG. 2A shows an embodiment of a boundary-free periodic partial mesh for full model method 280 according to an embodiment. The method 280 can be implemented by a system 104, such as a meshing system as shown in FIG. 11. The method 280 can include an operation 281 to identify a master region in a 2D geometry with a periodic pattern. The geometry can represent a physical structure in a simulation of the physical structure that has a periodic pattern.

The meshing system can also include an operation 282 to generate an adaptive base mesh of the identified master region. The meshing system can also include an operation to divide the generated adaptive base mesh of the master region into a first interior region and a first fringe region.

As illustrated further in FIG. 2A, the meshing system can also include an operation 283 to generate a first mesh to the first interior region of the master region.

Further, the meshing system can also include an operation 284 to partition the generated first mesh of the first interior region of the master region into a static portion 285 and a floating portion 286. According to the present disclosure, the embodiment of the method can further include an operation of mesh migration and assembling. The operation of mesh migration can include operations 287 of rotation and migration of floating portion 286. The operation of mesh assembling can include operation of assembling of static portion 285 and migrated floating portion 287.

In one embodiment, the meshing system can also include an operation 287 to rotate the floating portion by a periodic region angle. The meshing system can also include an operation to assemble the static portion and the migrated rotated floating portion to generate an arbitrary matching boundary mesh of the geometry with the periodic pattern.

In some embodiments, the meshing system can also include an operation 288 to divide the generated assembled arbitrary matching boundary mesh into a second interior region and a second fringe region.

The meshing system can also include an operation 288 to generate a second mesh to the second interior region of the generated assembled arbitrary matching boundary mesh. The meshing system can further include an operation 289 to generate a mesh output with a mapping.

Figure 3A:
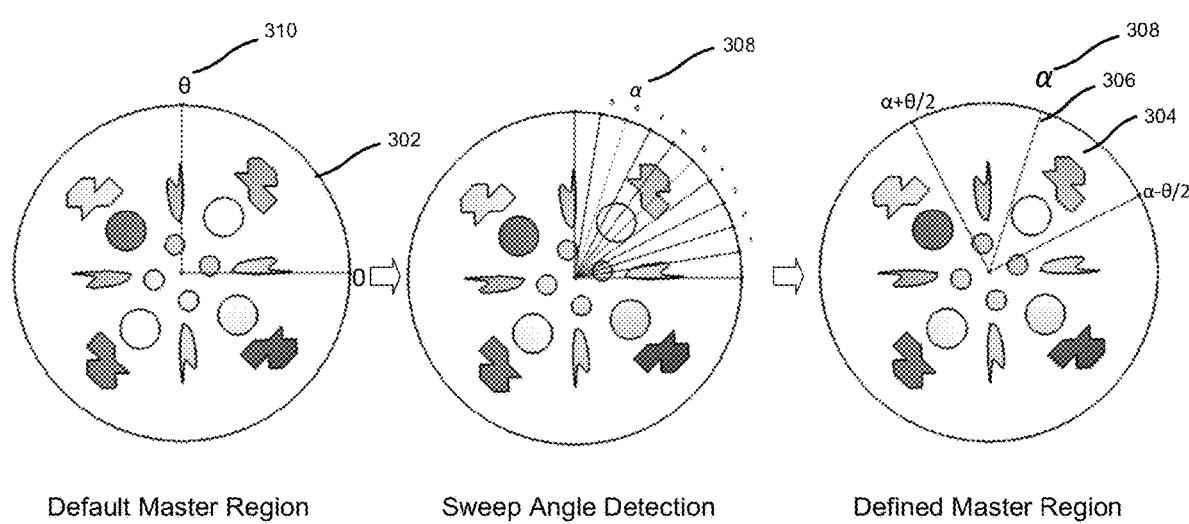
FIG. 3A shows an example diagram illustrating the identifying master region operation according to one embodiment of the disclosure.

As illustrated in FIG. 3A, for example, the operation to identify the master region can include identifying a default master region 302; detecting a sweep angle 308; and identifying the master region 304.

In one embodiment, the operation of identifying of the master region can include determining a default master region 302 of a region from 0 to a periodic region angle, θ, 310. The periodic region angle θ, 310 can be determined using Equation (1).

$$\theta = \frac{2.0 * \pi}{\text{number of periodic regions}} \quad (1)$$

In one embodiment, an operation of detecting the sweep angle can include creating cuts for every 10 degrees, for example, within the default master region and checking geometry intersections on each cut. The operation can also include determining an optimal cut of minimum geometry intersection α 308.

According to an embodiment, the $8^{th}$ cut, for example, can be determined as the optimal cut. Thus the sweeping angle, α 308 can be determined using Equation (2).

$$\alpha = 8 * \frac{\theta}{10\, deg} \quad (2)$$

If the periodic region angle, θ 310 is smaller than 30 degrees, for example, the sweeping angle, α 308 can be determined using Equation (3).

$$\alpha = \theta * 0.5 \quad (3)$$

In one embodiment, an operation of identifying the master region 304 can include generating a master region with central line 306 at optimal cut α 308. The master region 304 can cover a region from α−θ/2 to α+θ/2.

Figure 3B:
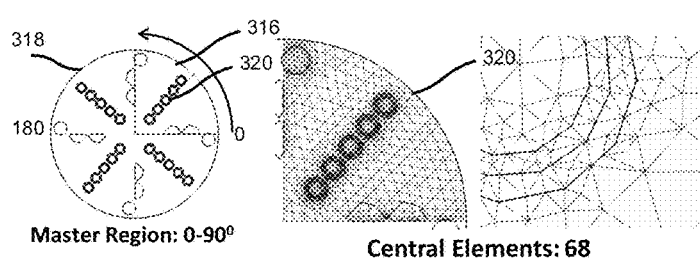
FIG. 3B shows an example diagram illustrating an optimized master region detection method capability according to one embodiment of the disclosure.
Figure 3B:
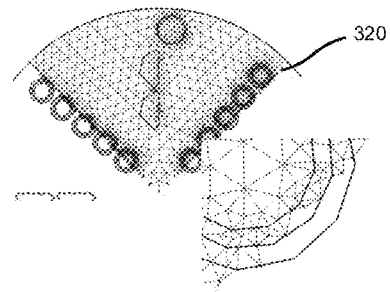
Figure 3B:
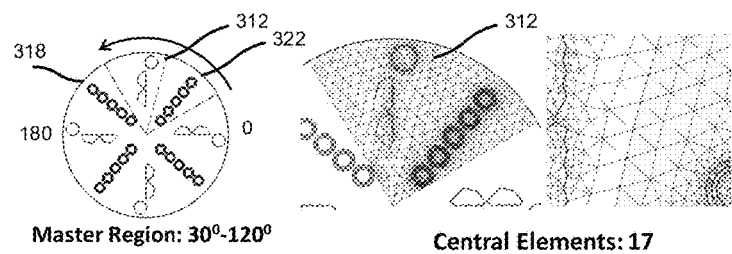
Figure 3B:
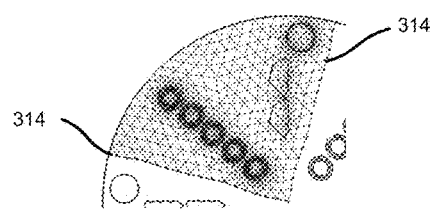

FIG. 3B shows an example of an optimized master region detection method that can be achieved through an embodiment of the boundary-free periodic partial mesh for full model method. A master region can include any of the repeatable regions in the geometry that represents a physical structure in a simulation. The optimized master region 322 choice can include a central plane 312 that has minimum geometry interactions, a central plane 312 region that can be a candidate of matching boundary 314 regions, a smaller element count on the matching boundary 314.

As further illustrated in FIG. 3B, a master region defined between an angle 30 and an angle 120 degree can be selected as an optimized master region 322 such that a central plane 312 has a minimum intersection with the features in the geometry 318. The central plane region can include smaller element count. In this example, the central element count is 17. The central plane region can be a good candidate of a matching boundary 314.

In one embodiment, a master region 316 defined between an angle 0 and an angle 90 degree can be selected to represent a periodic pattern of a geometry 318. A central plane 320 in the master region 316 can be detected. In this example, the central plane is selected such that the interaction between the central plane and the features in the geometry is not minimum. As a result, the element count is larger than when a central plane 312 is selected. For example, the central element count is 68.

Figure 4:
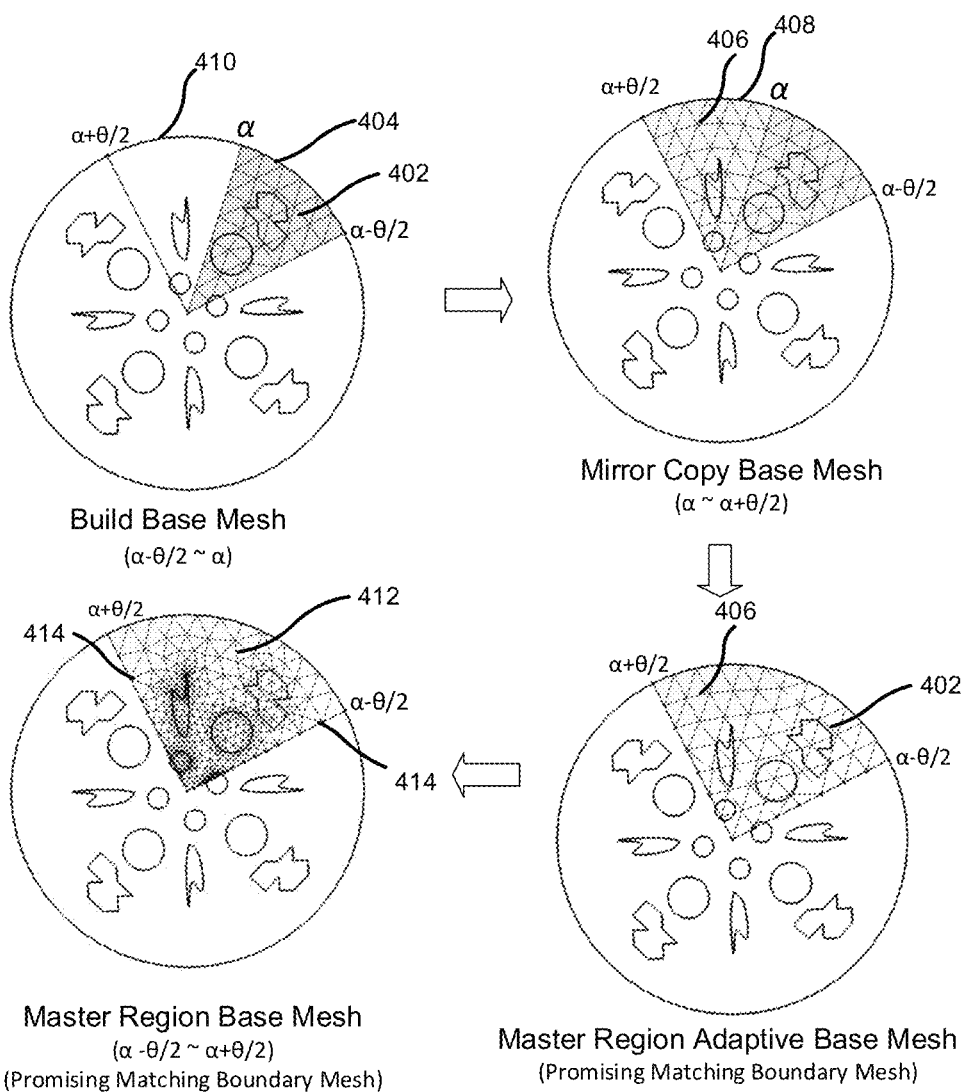
FIG. 4 shows an example diagram illustrating a base mesh builder operation according to one embodiment of the disclosure.

As illustrated in FIG. 4, the operation to generate the adaptive base mesh 412 can include generating a coarse mesh 402 of a first half portion 404 of the master region 410; generating a mirror mesh 406 of a second portion 408 of the master region 410 by mirroring the generated coarse mesh 402 to cover the second portion 408 of the master region 410; assembling the generated coarse mesh 402 of the first portion 404 of the master region 410 and the generated mirror mesh 406 of the second portion 408 of the master region 410; and adaptively refining the generated coarse mesh while maintaining a valid matching boundary condition 414.

As further illustrated in FIG. 4, the first portion of mesh 406 and the second portion of mesh 408 may maintain the matching boundary condition at mesh at angle $\alpha-\theta/2$ and mesh at angle $\alpha+\theta/2$ since mesh at angle $\alpha+\theta/2$ is a mirrored copy of mesh at angle $\alpha-\theta/2$. During the adaptive refinement of the generated coarse mesh 402, the matching boundary condition can also be maintained at an angle $\alpha-\theta/2$ and an angle $\alpha+\theta/2$. For example, adding a mesh point to refine the mesh at angle $\alpha-\theta/2$ may also require adding a corresponding mesh point at angle $\alpha+\theta/2$.

Figure 5A:
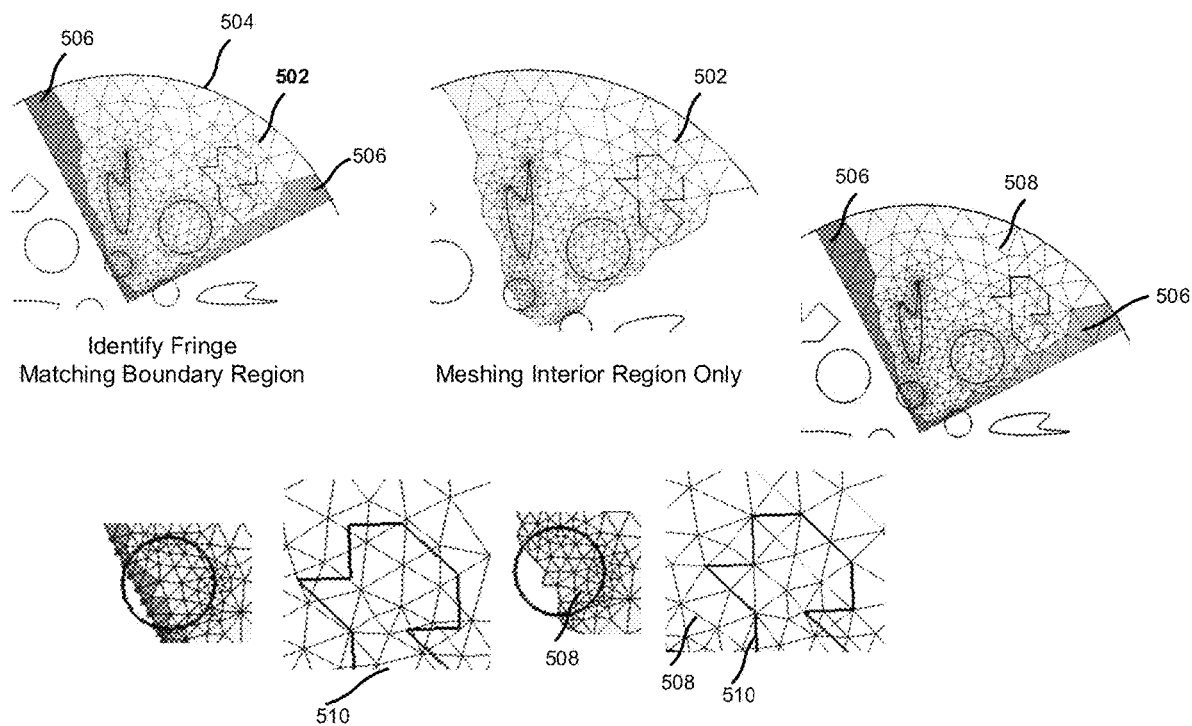
FIG. 5A shows an example diagram illustrating an interior region mesh (Stage-1) operation according to one embodiment of the disclosure.

FIG. 5A shows an example diagram illustrating an interior region mesh (stage-1) operation according to one embodiment of the disclosure. In one embodiment, for example, the operation to generate the first mesh to the first interior region 502 of the master region 504 can include identifying a first fringe region 506; freezing the first fringe region 506; meshing the geometry features in first interior region; and assembling the generated first mesh 508 of the first interior region 502 of the master region 504 and the frozen first fringe region 506. In some embodiments, the first fringe region 506 can include a plurality of mesh elements connected to the matching boundary mesh. At the end of the operation to generate the first mesh, the first fringe mesh remains unmeshed, wherein the geometry feature may have not been recovered in the mesh. Similarly, the interior feature within the first interior region 502 of the master region 504 is meshed at the end of the operation to generate the first mesh, wherein all geometry features may have been recovered in the mesh.

Figure 5B:
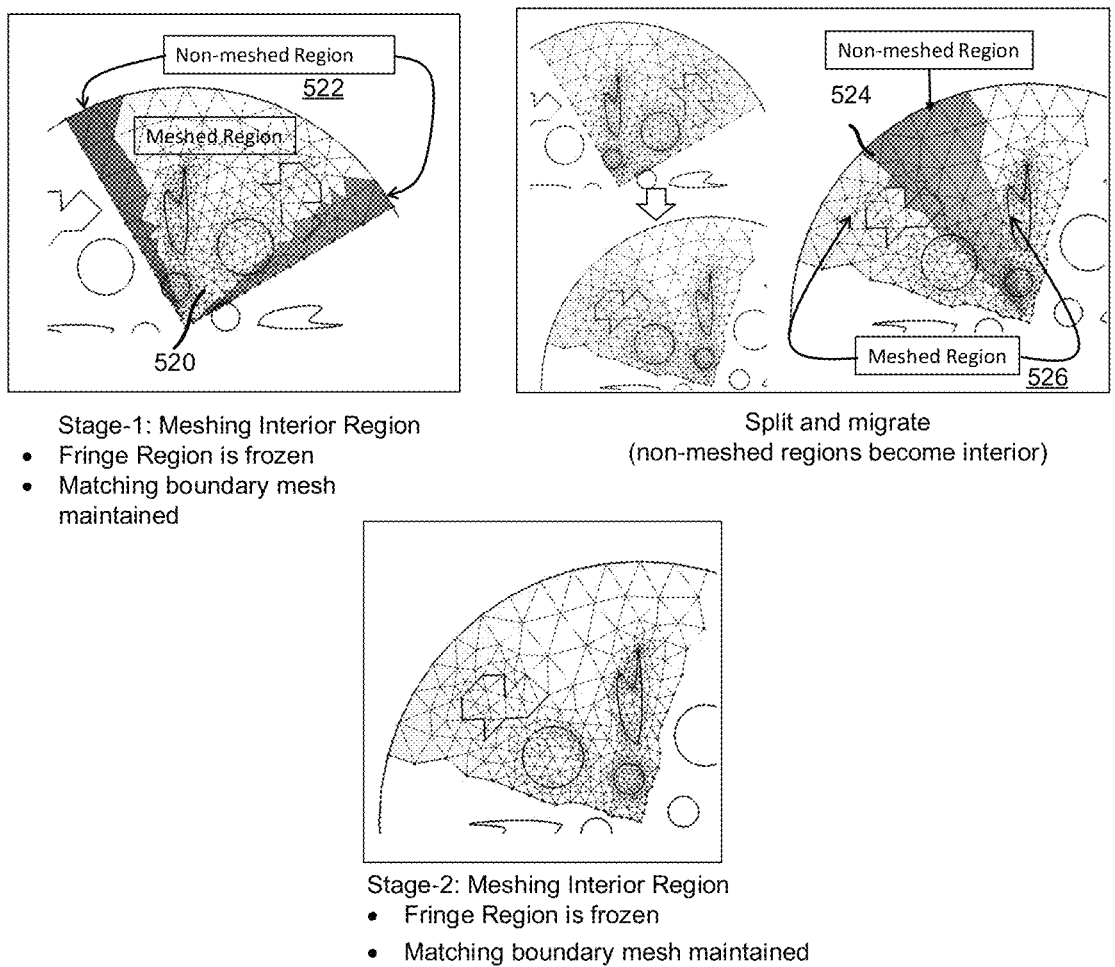
FIG. 5B shows an example diagram illustrating an interior region only meshing method according to one embodiment of the disclosure.

According to an embodiment of the present disclosure, the method can also provide an interior region only meshing method as illustrated in FIG. 5B. The method can be operated in the interior region 520 only while the fringe regions 522 are frozen. The interior region 520 can be meshed and the fringe regions 522 may not be meshed. No mesh point or mesh edge can be modified in the fringe regions 522 during this method. The matching boundary condition maintained in FIG. 4 may not be modified since the matching boundary condition is part of the fringe regions 522. Hence, a matching boundary mesh can be maintained at all the times. The interior region only meshing method can be a two stage mesh generation method. For example, in a stage-1 of the meshing interior region 520, the fringe region 522 is frozen and the matching boundary mesh can be maintained. During the split and merge as will be discussed in detail in FIG. 6B, the non-meshed regions which were fringe regions 522 can become an interior region 524 of the master region. The interior region 520 which has been meshed can become fringe regions 526 in the master region. In a stage-2 of the meshing interior region 524, for example, the fringe regions 526 can be frozen and the matching boundary mesh can be maintained. After a stage-2 of the meshing of the interior region, the master region can be fully meshed while maintaining a matching a non-planar boundary mesh at a boundary between patterns of a periodic region of a geometry.

Figure 6A:
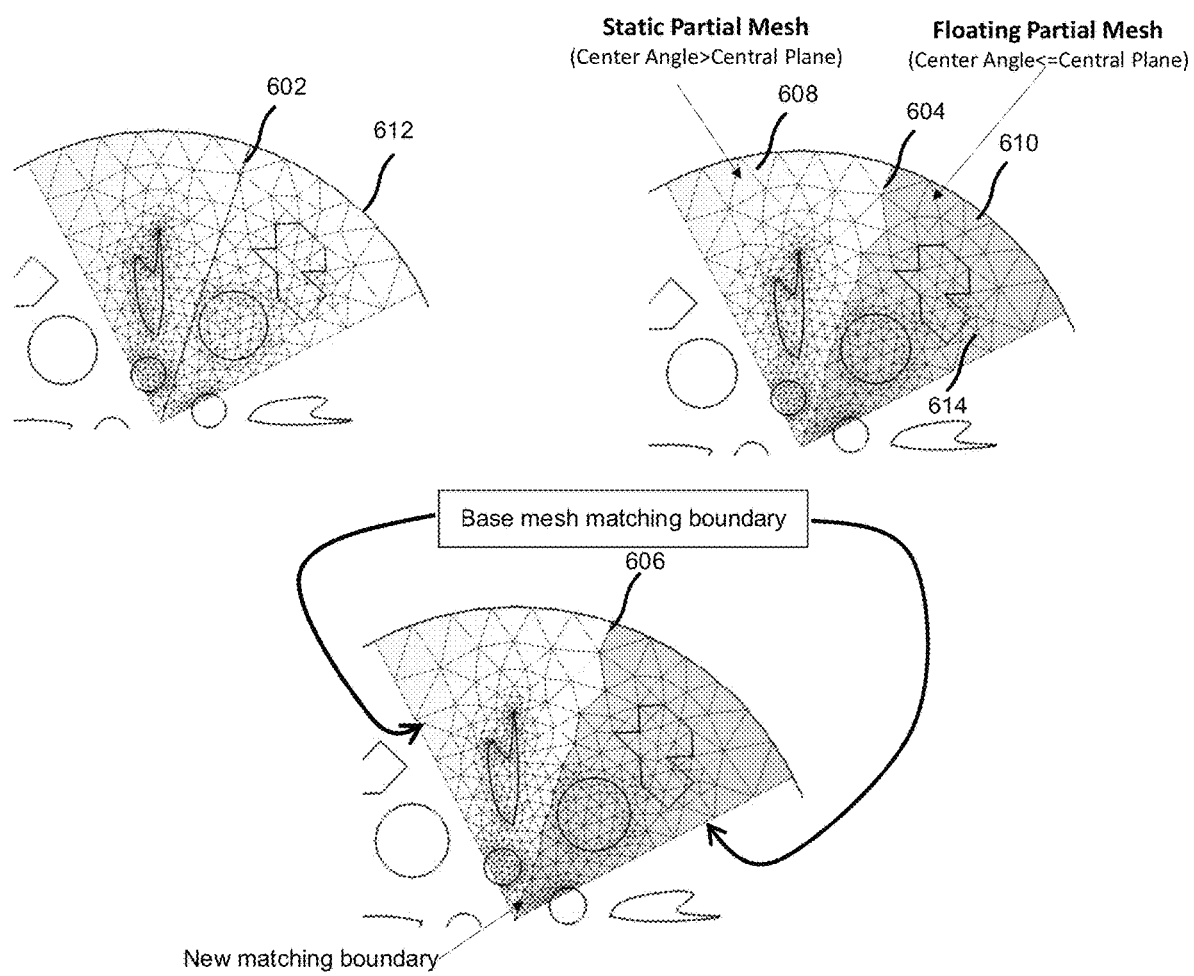
FIG. 6A shows an example diagram illustrating a mesh split operation according to one embodiment of the disclosure.

An example of the operation of mesh split is shown in FIG. 6A. The mesh split operation can include identifying central plane 602 in the master region, splitting the mesh by a mesh edge 604, and building new arbitrary boundary 606. The central plane 602 can be determined based on the central plane angle. The central plane 602 can cut through the master region 612 with a minimum geometry intersection. In one embodiment, the mesh 614 in the master region 612 can be split into a static partial mesh 608 and a floating partial mesh 610.

In one embodiment, the static segment 608 can include a plurality of elements in the generated first mesh 614 of the first interior region of the master region 612 having a central point location angle larger than the central plane angle.

In one embodiment, the floating segment 610 includes a plurality of elements in the generated first mesh 614 of the first interior region of the master region 612 having a central point location angle equal to or smaller than the central plane angle.

In an embodiment, the meshing system can include an operation to create a new arbitrary boundary 606 at an interface of the static segment 608 and the floating segment 610.

Figure 6B:
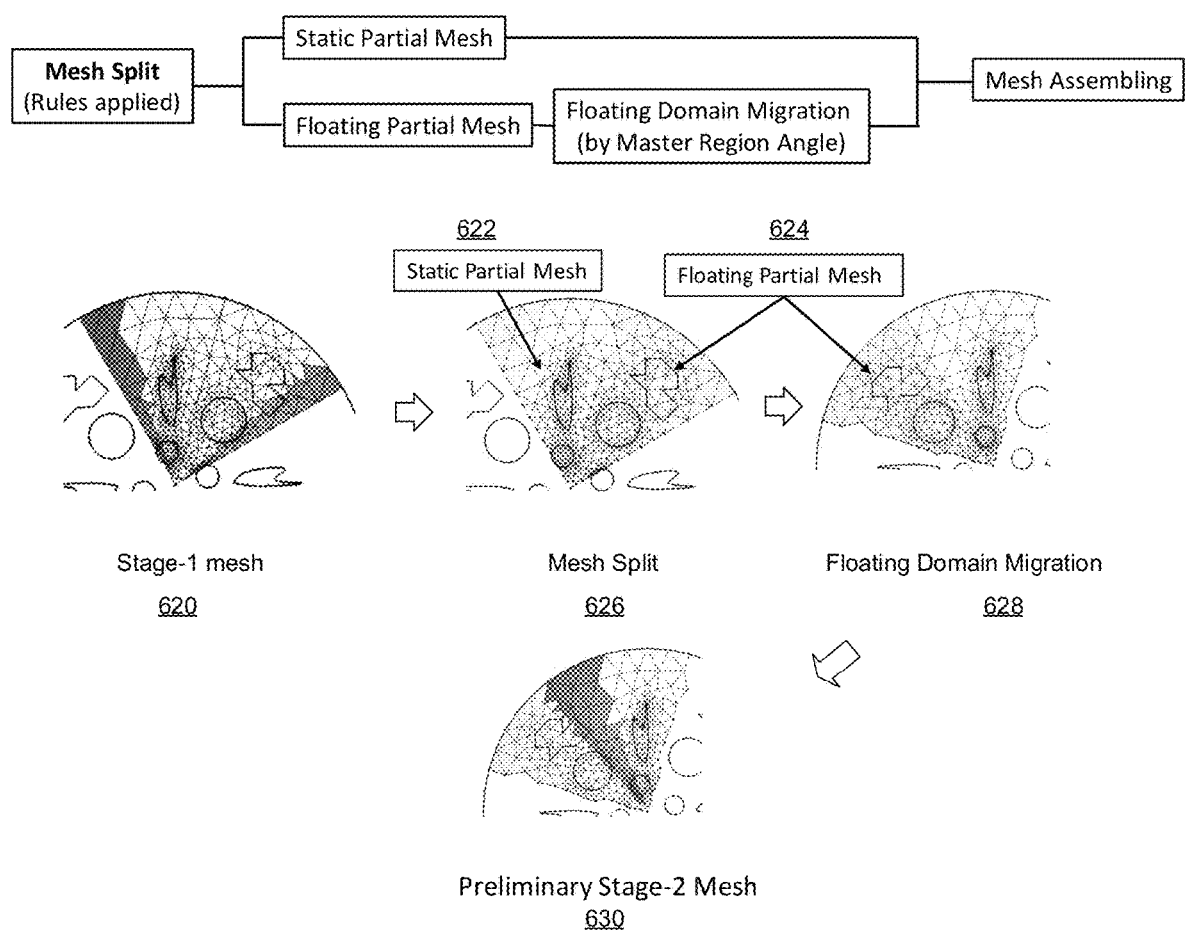
FIG. 6B shows an example diagram illustrating a mesh split and floating partial mesh migration according to one embodiment of the disclosure.

As shown in FIG. 6B, the method can also provide mesh split and floating partial mesh migration capability. In this manner, an automated arbitrary matching boundary mesh builder can be provided. During the mesh split operation 626, rules can be applied to divide the stage-1 mesh 620 into a static partial mesh 622 and floating partial mesh 624. The region can be split where mesh-geometry interactions are minimum. In floating partial mesh, the floating domain migration 628 can be performed based on a master region angle. Thereafter, the static partial and the floating partial mesh can be assembled at an operation of mesh assembling. The solver demands can also be applied. In one embodiment, the assembled mesh can be used in a stage-2 mesh 630 operation.

Figure 7:
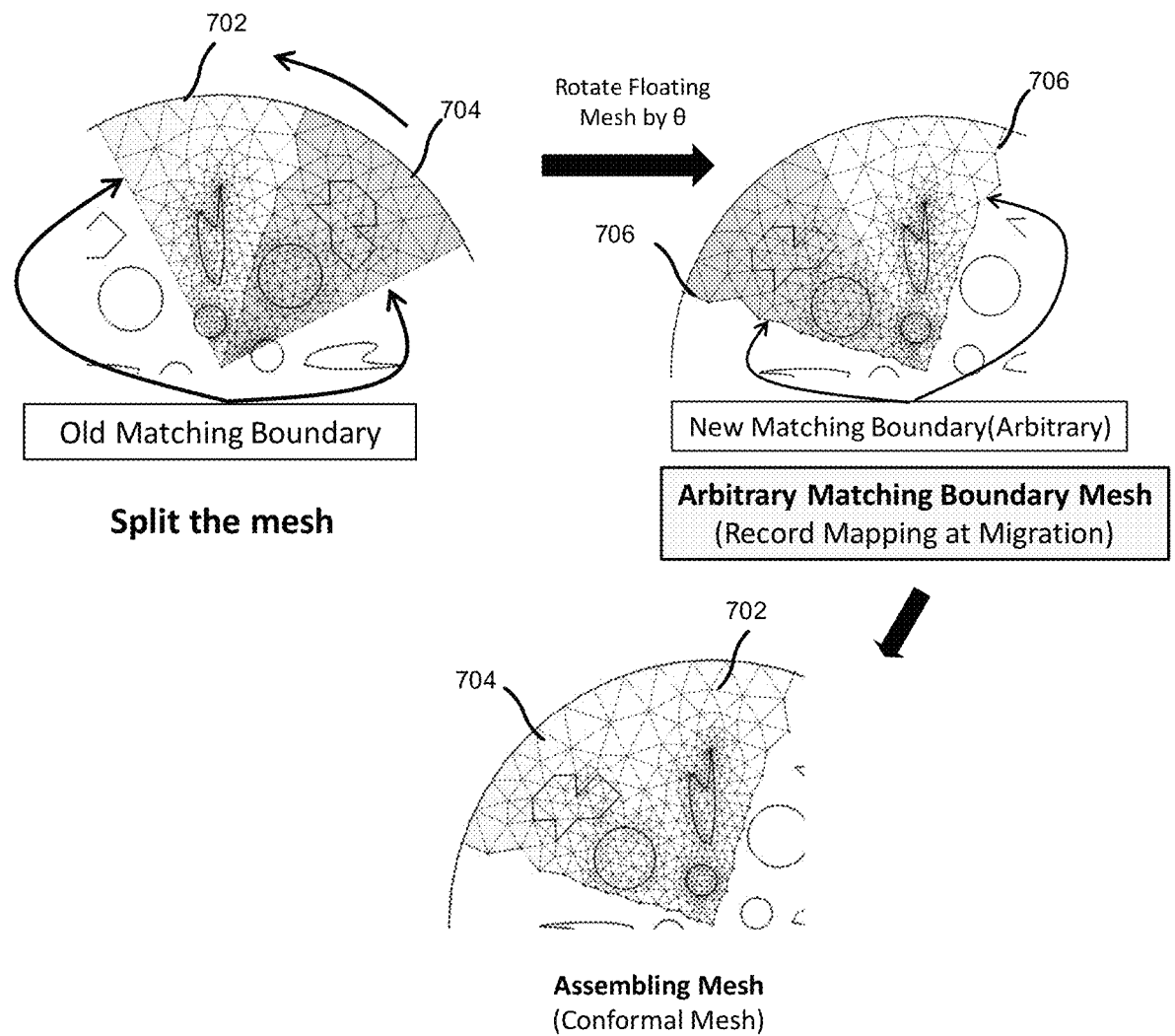
FIG. 7 shows an example diagram illustrating a mesh migration assembling operation according to one embodiment of the disclosure.

An example of the operation of mesh migration assembling is shown in FIG. 7. The operation of mesh migration assembling can include splitting the mesh into the static mesh segment 702 and the floating mesh segment 704, rotating the floating mesh segment by a periodic region angle, $\theta$. The new arbitrary matching boundary 706 can be obtained. Further, the operation can include, assembling the rotated floating mesh segment 704 and the static mesh segment 702. The interface between the rotated floating mesh segment 704 and the static mesh segment 702 can include the previous matching boundary, which can ensure the mesh after assembling can be conformal at the interface.

Figure 8:
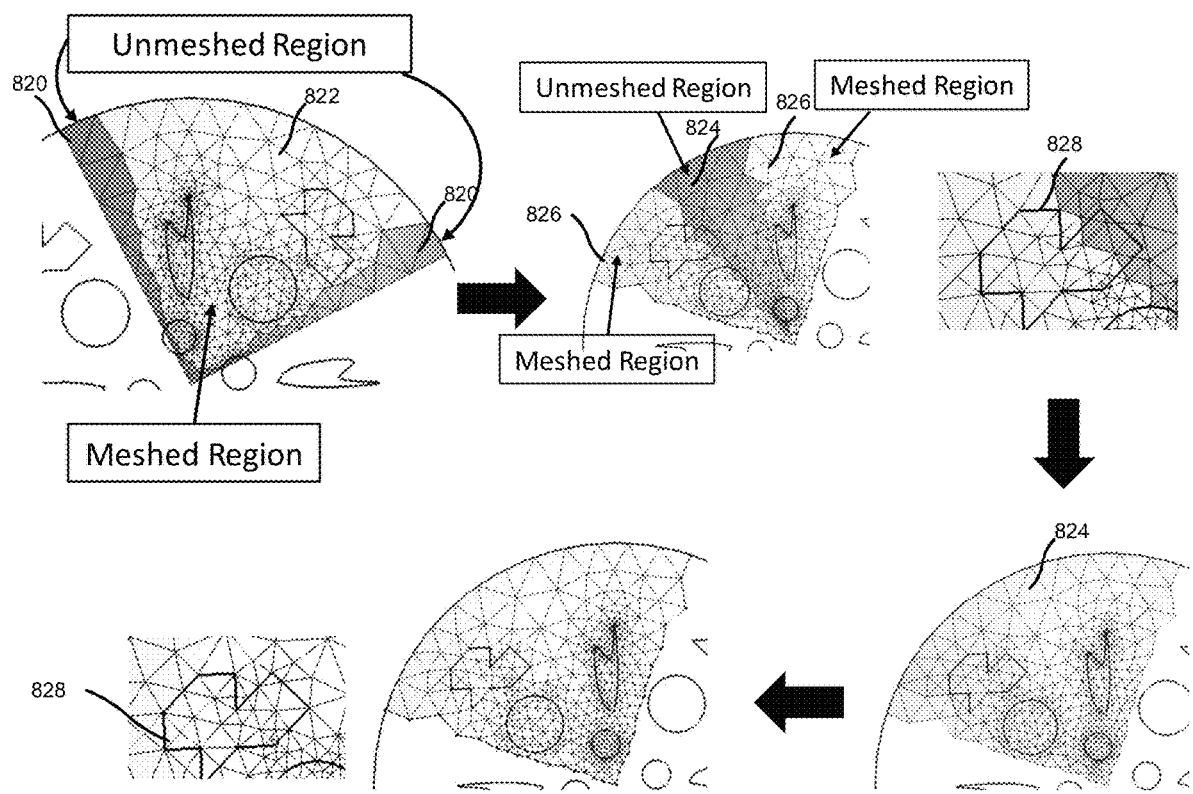
FIG. 8 shows an example diagram illustrating an interior region mesh (Stage-2) operation according to one embodiment of the disclosure.

An example of the operation of interior region mesh is shown in FIG. 8. Stage 1 can include the interior mesh 822 in the interior region that is complete or meshed and the fringe mesh 820 that is not complete or unmeshed. After split and migration, the previous interior mesh 822 can occupy the new fringe region 826 and the previous fringe mesh 820 can occupy the new interior region 824. At this stage, the feature 828 in the new interior mesh region has not been fully meshed. The operation of interior region mesh can be repeated to identify fringe matching boundary region.

After the fringe matching boundary region has been identified, the previous fringe mesh 820 in the new interior region 824 can be meshed. After the previous fringe mesh 820 in the new interior region 824 has been meshed, the mesh of the previous interior mesh 822 in the new fringe region 826 and the previous fringe matching boundary region 824 are now complete. The feature 828 in the master region has been fully meshed.

The present disclosure is also directed to an embodiment of a meshing system that can include a non-transitory machine readable medium storing executable program instructions which when executed by a data processing system cause the data processing system to perform a method.

Figure 2B:
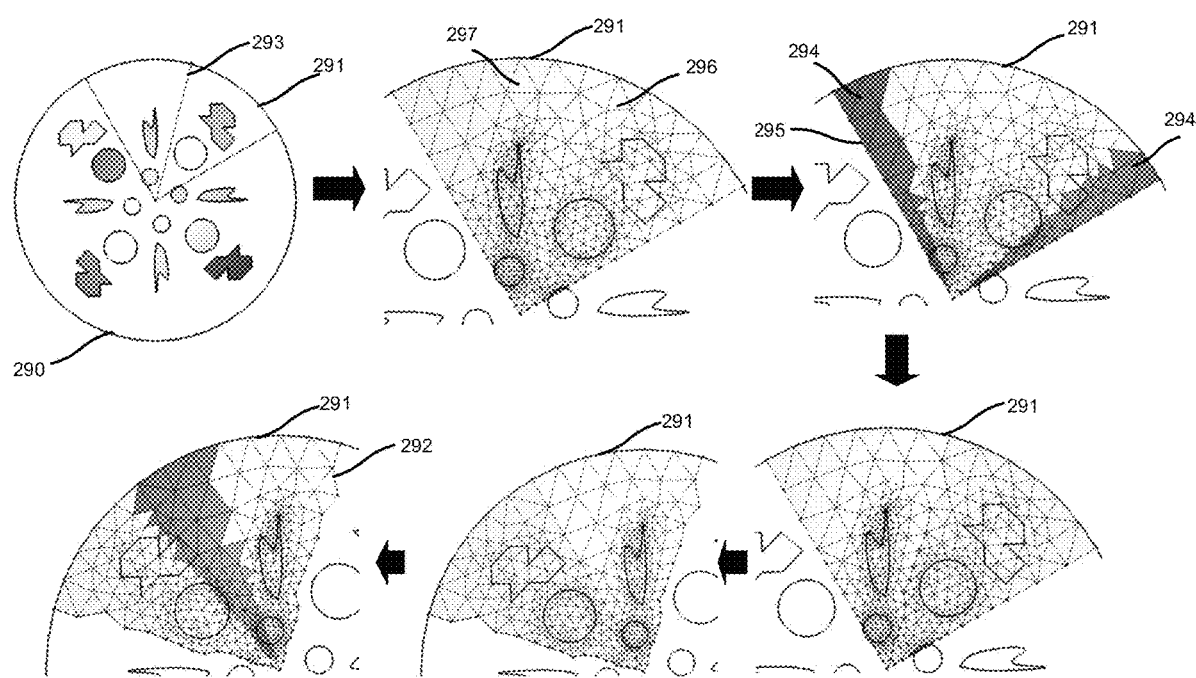
FIG. 2B shows an example diagram illustrating one embodiment of boundary-free periodic partial mesh for full model method according to one embodiment of the disclosure.

As illustrated in FIG. 2B, in an embodiment, the method can include identifying a master region 291 in a periodic pattern of a geometry 290 that represents a physical structure in a simulation of the physical structure that has the periodic pattern. The method can also include generating a mesh based on the identified master region 291. The mesh can include a non-planar boundary 292 at a boundary between patterns in the periodic pattern. The master region 291 can be only a portion of the representation of the physical structure.

In one embodiment, the identifying can include detecting an optimized cut 293 through the master region 291 based on a minimal intersection of geometries representing objects in the physical structure.

In one embodiment, the generating can include generating a plurality of mesh regions within the identified master region 291.

In one embodiment, a result from the simulation can be used to design the physical structure or is used to modify the design of the physical structure or is used to configure a fabrication or manufacturing process for the physical structure.

In one embodiment, the non-planar boundary 292 can be constructed based on the detected optimized cut 293 through the master region.

In one embodiment, the generating can include detecting a plurality of regions 294 at the boundary 295 between patterns, the plurality of regions 294 being excluded from being meshed.

In one embodiment, the generated mesh can be partitioned into a plurality of regions based on the detected optimized cut 293 through the master region 291.

In one embodiment, the generated plurality of mesh regions within the identified master region can include a base mesh 296 and a duplicate mesh 297. In one embodiment, a boundary region of the duplicate mesh can share an identical characteristic as a region in the base mesh at the boundary between patterns in the periodic pattern.

The present disclosure is also directed to an embodiment of a meshing system that can include a non-transitory machine readable medium storing executable program instructions which when executed by a data processing system cause the data processing system to perform a method.

In one embodiment, the method can include identifying a master region in a geometry representing a physical structure. In one embodiment, the geometry can correspond to repetitions of the master region. As illustrated in FIG. 3A, a master region 304 can cover a region from $\alpha-\theta/2$ to $\alpha+\theta/2$, where $\theta$ is the sweeping angle of the master region.

In one embodiment, the method can also include generating an adaptive base mesh 412 of the identified master region 410 as illustrated in FIG. 4. In one embodiment, the adaptive base mesh 412 can include matching boundaries 414. In one embodiment, each matching boundary 414 can be next to a respective neighboring repetition of the master region in the geometry.

Referring to FIG. 5A, in one embodiment, the method can further include generating a first mesh 502 for features 510 of the geometry in a portion of the master region 504 bounded by boundary meshes 506 of the matching boundaries in the adaptive base mesh. In one embodiment, the first mesh can be generated with the boundary meshes 506 frozen.

Referring to FIG. 6A, in one embodiment, the method can further include partitioning the generated first stage mesh into a first portion 608 and a second portion 610 along an arbitrary mesh boundary 604. In one embodiment, the first portion 608 can be connected to a first one of the boundary meshes via a first one of the matching boundaries. In one embodiment, the second portion 610 can be connected to a second one of the boundary meshes via a second one of the matching boundaries.

In one embodiment, the method can further include generating an arbitrary matching boundary mesh representing a separate region of the geometry. In one embodiment, the geometry can correspond to repetitions of the separate region. In one embodiment, the arbitrary matching boundary mesh can correspond to an assembly of the first portion 608 connected to the first one boundary mesh and the second portion 610 connected to the second one boundary mesh as shown in FIG. 6A. In one embodiment, the arbitrary matching boundary mesh can include matching boundaries.

In one embodiment, each matching boundary of the arbitrary matching boundary mesh can correspond to the mesh boundary for the partition of the first portion 608 and the second portion 610 as illustrated in FIG. 6A. In one embodiment, each matching boundary of the arbitrary matching boundary mesh next to a respective neighboring repetition of the separate region in the geometry.

In one embodiment, the method can further include generating a second mesh for features of the geometry in the portion of the master region bounded by boundary meshes of the matching boundaries in the adaptive base mesh as illustrated in FIG. 8. In one embodiment, the second mesh can be generated with the boundary meshes frozen.

In one embodiment, the second portion can be rotated by a periodic region angle.

Figure 9:
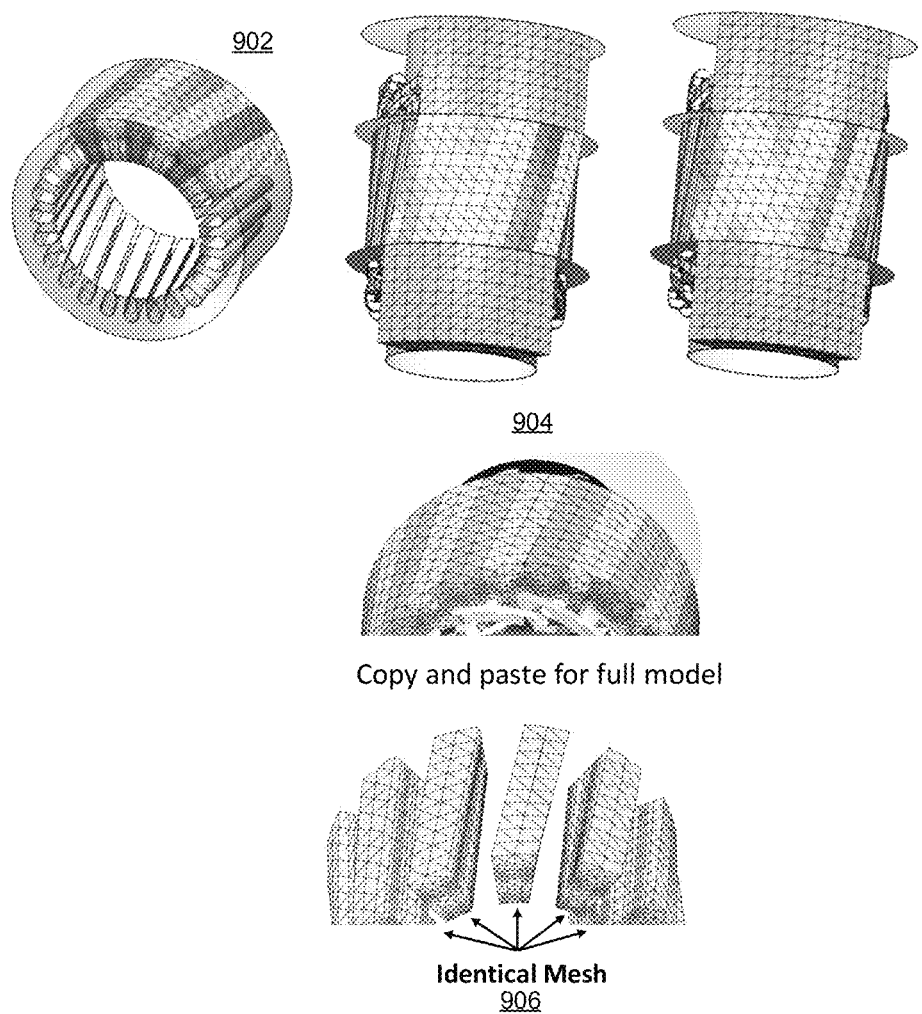
FIG. 9 shows an example diagram illustrating a partial clone mesh with a full model according to one embodiment of the disclosure.

FIG. 9 shows the boundary-free periodic mesh approach that allows copying the partial mesh 902 generated by the method to a full model 904 to get a full mesh of the geometry. Comparing to a traditional method, the method disclosed herein can ensure an identical clone mesh 906 near the matching boundary, by avoiding geometry cut.

The partial mesh with full model clone mesh with non-planar boundary mesh method can also provide a multi-region base mesh builder that can copy and paste for full model 904 to generate an identical model 906 as shown in FIG. 9. As further illustrated in FIG. 9, the generated mesh 902 that represents a portion the periodic pattern of the geometry can be duplicated (copy and paste) until a number of duplicated mesh represents or covers the full model. Each of the duplicated mesh can be identical to the generated mesh. In this manner, a high quality matching boundary mesh can be achieved in skewed duplicated regions. In contrast, when a full model of a skewed motor geometry is cut to represent a periodic pattern of the full model before meshing, the generated duplicated mesh cannot maintain the periodic identity at the planar matching boundary. As a result, this limitation to the traditional method can introduce simulation errors.

Figure 10A:
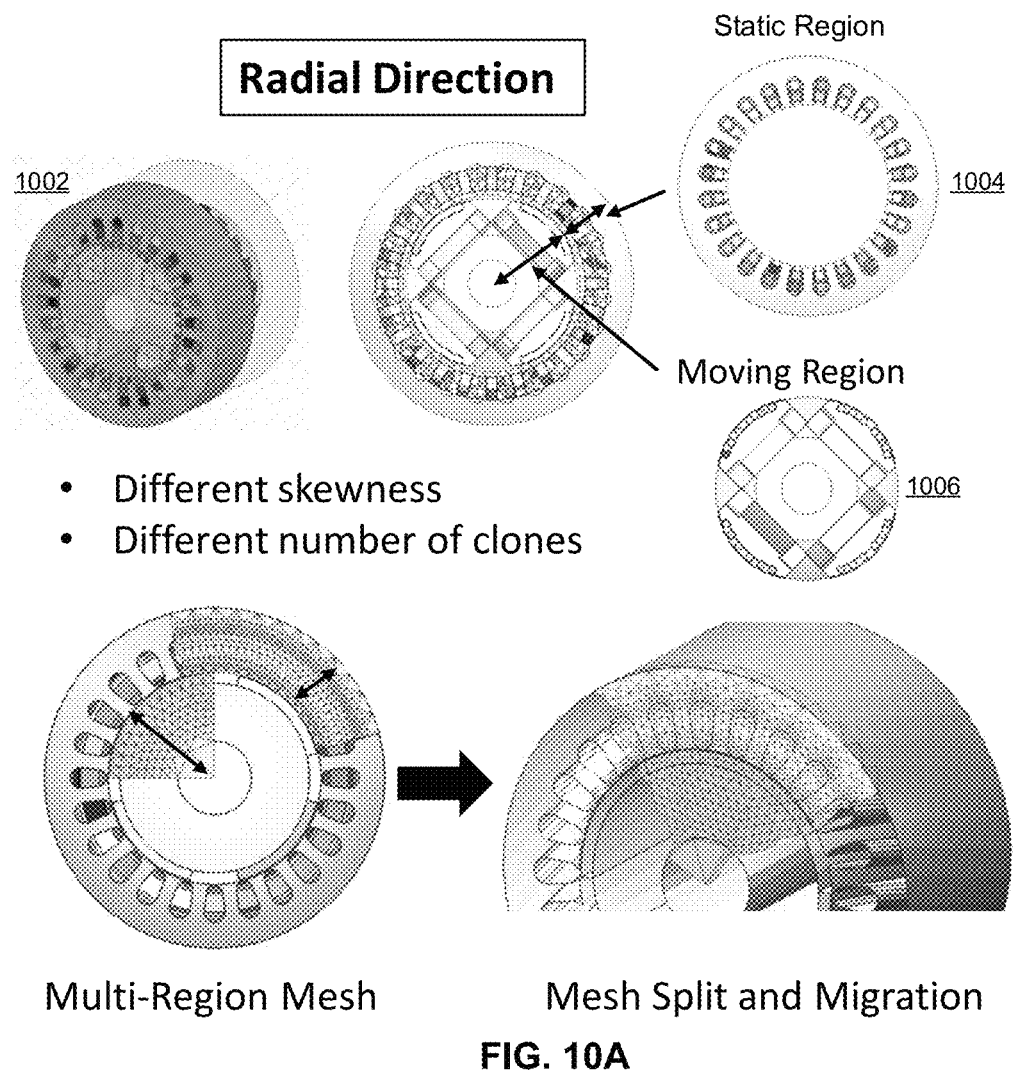
FIG. 10A shows an example diagram illustrating a multi-region base mesh builder capability being applied on a radial direction of a rotational motor simulation according to one embodiment of the disclosure.

FIG. 10A shows a schematic illustrating a multi-region base mesh builder capability according to one embodiment of the disclosure. In one embodiment, simulating a geometry such as a rotational motor can require a separate meshing in the radial and in the axial directions. In the radial direction, meshing the motor may require different skewness and different number of clones. As a result, different skewness and different number of clones can be required during meshing a geometry such as the rotational motor. In addition, a geometry 1002 such as the rotational motor as shown in FIG. 10A can be divided into a static region 1004 and a moving region 1006. As a result, the static region 1004 and the moving region 1006 can require different mesh. The embodiment method having a multi-region base mesh builder capability described herein can be used to mesh multi regions in the geometry 1002 such as the rotational motor.

Figure 10B:
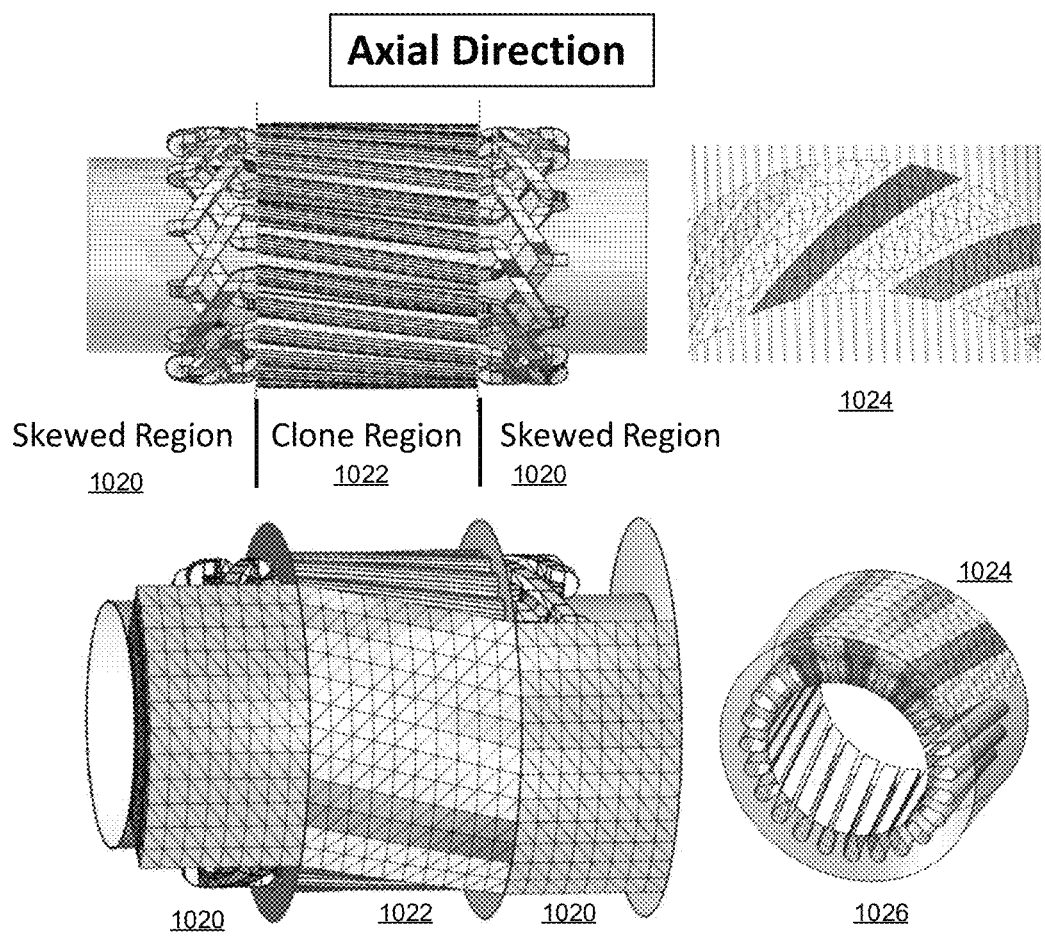
FIG. 10B shows a schematic illustrating a multi-region base mesh builder capability being applied on an axial direction of a rotational motor simulation according to one embodiment of the disclosure.

FIG. 10B shows a schematic illustrating a multi-region base mesh builder capability according to one embodiment of the disclosure. In a simulation of a rotational motor design in an axial direction, a full motor model can often involve skewed regions. The embodiments of a method having a multi-region base mesh builder capability described herein can be used to mesh multi regions in the geometry 1026 such as the rotational motor. The geometry 1026 can include skewed region 1020 and clone region 1022. The approach described herein can provide a hundred percent of a repeatable identical mesh 1024 in a skewed clone region 1022 as shown in FIG. 10B.

The methods and systems described herein may be implemented using any suitable processing system with any suitable combination of hardware, software and/or firmware, such as described below with reference to the non-limiting examples of FIGS. 11, 12A, 12B, and 12C.

FIG. 11 depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user.

Figure 12A:
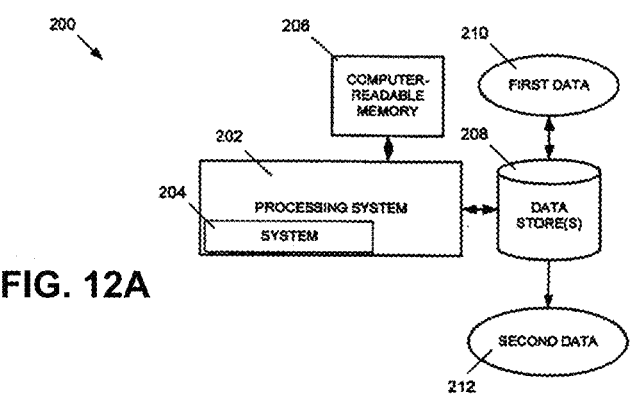
Figure 12B:
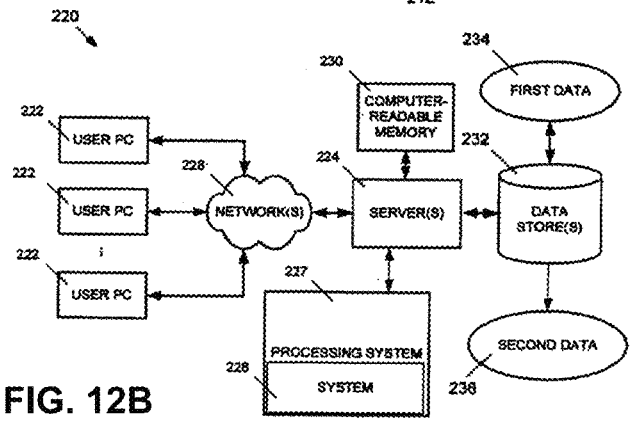
Figure 12C:
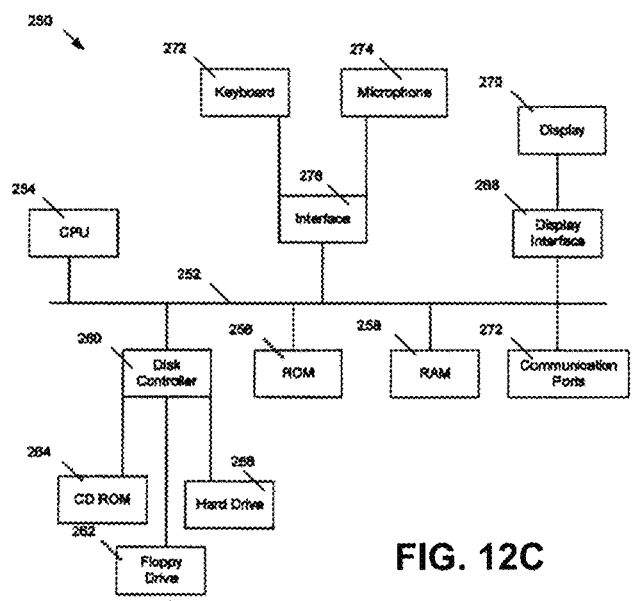

FIGS. 12A, 12B, and 12C depict example systems for use in implementing a system. For example, FIG. 12A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 12B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 12C shows a block diagram of exemplary hardware for a standalone computer architecture 250, such as the architecture depicted in FIG. 12A, that may be used to contain and/or implement the program instructions of system embodiments of the present invention. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the invention, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable program instructions which when executed by a data processing system cause the data processing system to perform a method, the method comprising:
   generating a plurality of radial cut lines radiating from an axis of rotation for a geometry representing a physical structure that has a periodic pattern;
   determining geometry intersections between each of the plurality of radial cut lines and features in the geometry, wherein the features in the geometry represent objects in the physical structure that are rotationally periodic with a periodic region angle about the axis of rotation;
   selecting a central cut line among the plurality of radial cut lines based on the central cut line having fewer geometry intersections than the plurality of radial cut lines;
   identifying, based on the central cut line, a defined master region to represent the periodic pattern around the axis of rotation of the geometry;
   generating an adaptive base mesh of the defined master region;
   dividing the generated adaptive base mesh of the defined master region into a first interior region and a first fringe region;
   generating a first mesh to the first interior region of the defined master region;
   partitioning the generated first mesh of the first interior region of the defined master region into a static portion and a floating portion;
   rotating the floating portion by the periodic region angle; and
   assembling the static portion and the floating portion to generate an arbitrary matching boundary mesh of the geometry with the periodic pattern.

2. The medium, as in claim 1, the method further comprising:
   dividing the generated assembled arbitrary matching boundary mesh into a second interior region and a second fringe region; and
   generating a second mesh to the second interior region of the generated assembled arbitrary matching boundary mesh.

3. The medium, as in claim 1, wherein the identifying of the defined master region comprises:

identifying a default master region, wherein the default master region is one of a plurality of periodic regions in the geometry, and wherein the default master region has the periodic region angle based on a number of the plurality of periodic regions in the geometry; and detecting a sweep angle, wherein the sweep angle is part of the periodic region angle.

4. The medium, as in claim 3, wherein detecting the sweep angle includes checking the geometry intersections on each of the plurality of radial cut lines through the default master region.

5. The medium, as in claim 1, wherein the generating of the adaptive base mesh comprises:

generating a coarse mesh of a first portion of the defined master region;

generating a mirror mesh of a second portion of the defined master region by mirroring the generated coarse mesh about the central cut line to cover the second portion of the defined master region;

assembling the generated coarse mesh of the first portion of the defined master region and the generated mirror mesh of the second portion of the defined master region; and adaptively refining the generated coarse mesh while maintaining a valid matching boundary.

6. The medium, as in claim 1, wherein the first fringe region includes a plurality of mesh elements connected to the matching boundary mesh.

7. The medium, as in claim 1, wherein the generating of the first mesh to the first interior region of the defined master region comprises:

freezing the first fringe region;

meshing the geometry features in first interior region; and assembling the generated first mesh of the first interior region of the defined master region and the frozen first fringe region.

8. The medium, as in claim 1, wherein the static portion includes a plurality of elements in the generated first mesh of the first interior region of the defined master region having a central point location angle larger than a central plane angle of a central plane of the defined master region extending along the central cut line.

9. The medium, as in claim 1, wherein partitioning the generated first mesh is by a central plane of the defined master region extending along the central cut line, wherein the floating portion includes a plurality of elements in the generated first mesh of the first interior region of the defined master region having a central point location angle equal to or smaller than a central plane angle of the central plane.

10. The medium, as in claim 1, the method further comprising:

creating a new arbitrary boundary at an interface of the static portion and the floating portion.

11. A non-transitory machine readable medium storing executable program instructions which when executed by a data processing system cause the data processing system to perform a method, the method comprising:

generating a plurality of radial cut lines radiating from an axis of rotation for a geometry representing a physical structure that has a periodic pattern;

determining geometry intersections between each of the plurality of radial cut lines and features in the geometry, wherein the features in the geometry represent objects in the physical structure that are rotationally periodic with a periodic region angle about the axis of rotation;

selecting a central cut line among the plurality of radial cut lines based on the central cut line having fewer geometry intersections than the plurality of radial cut lines;

identifying, based on the central cut line, a defined master region to represent the periodic pattern around the axis of rotation of the geometry; and generating a mesh based on the defined master region, the mesh including a non-planar boundary at a boundary between patterns in the periodic pattern, wherein the defined master region is only a portion of the representation of the physical structure.

12. The medium, as in claim 11, wherein the generating comprises generating a plurality of mesh regions within the defined master region.

13. The medium, as in claim 11, wherein the physical structure is in a simulation, and wherein a result from the simulation is used to design the physical structure or is used to modify the design of the physical structure or is used to configure a fabrication or manufacturing process for the physical structure.

14. The medium, as in claim 11, wherein the non-planar boundary is constructed based on the central cut line.

15. The medium, as in claim 11, wherein the generated mesh based on the defined master region is duplicated to generate a conformal mesh for the geometry that represents the physical structure.

16. The medium, as in claim 11, wherein the generated plurality of mesh regions maintains a matching boundary condition at the boundary between patterns in the periodic pattern of the geometry that represents the physical structure.

17. The medium, as in claim 11, wherein the generating comprises detecting a plurality of regions at the boundary between patterns, the plurality of regions being excluded from being meshed.

18. The medium, as in claim 11, wherein the generated mesh is partitioned, by a central plane extending along the central cut line, into a plurality of regions.

19. The medium, as in claim 12, wherein the generated plurality of mesh regions within the defined master region include a base mesh and a duplicate mesh, a boundary region of the duplicate mesh sharing an identical characteristic as a region in the base mesh at the boundary between patterns in the periodic pattern.

20. A non-transitory machine readable medium storing executable program instructions which when executed by a data processing system cause the data processing system to perform a method, the method comprising:

generating a plurality of radial cut lines radiating from an axis of rotation for a geometry representing a physical structure that has a periodic pattern;

determining geometry intersections between each of the plurality of radial cut lines and features in the geometry, wherein the features in the geometry represent objects in the physical structure that are rotationally periodic with a periodic region angle about the axis of rotation;

selecting a central cut line among the plurality of radial cut lines based on the central cut line having fewer geometry intersections than the plurality of radial cut lines;

identifying, based on the central cut line, a defined master region to represent the periodic pattern around the axis of rotation of the geometry;

generating an adaptive base mesh of the defined master region, the adaptive base mesh comprising matching boundaries, each matching boundary next to a respective neighboring repetition of the defined master region in the geometry;

generating a first mesh for features of the geometry in a portion of the defined master region bounded by boundary meshes of the matching boundaries in the adaptive base mesh, wherein the first mesh is generated with the boundary meshes frozen;

partitioning the generated first mesh into a first portion and a second portion along a mesh boundary, wherein the first portion is connected to a first one of the boundary meshes via a first one of the matching boundaries, and wherein the second portion is connected to a second one of the boundary meshes via a second one of the matching boundaries; and generating an arbitrary matching boundary mesh representing a separate region of the geometry, wherein the geometry corresponds to repetitions of the separate region, wherein the arbitrary matching boundary mesh corresponds to an assembly of the first portion connected to the first one boundary mesh and the second portion connected to the second one boundary mesh, and wherein the arbitrary matching boundary mesh comprise matching boundaries, each matching boundary of the arbitrary matching boundary mesh corresponding to the mesh boundary for the partition of the first portion and the second portion, and each matching boundary of the arbitrary matching boundary mesh next to a respective neighboring repetition of the separate region in the geometry.

21. The medium, as in claim 20, the method further comprising:

generating a second mesh for features of the geometry in the portion of the defined master region bounded by boundary meshes of the matching boundaries in the adaptive base mesh, wherein the second mesh is generated with the boundary meshes frozen.

22. The medium, as in claim 20, wherein the second portion is rotated by the periodic region angle.

* * * * *